United States Patent [19]
Sekine

[11] Patent Number: 5,205,330
[45] Date of Patent: Apr. 27, 1993

[54] AIR BREATHER SYSTEM FOR FUEL TANK
[75] Inventor: Hidetoshi Sekine, Kiryu, Japan
[73] Assignee: Fuji Jukogyo Kabushiki Kaisha, Tokyo, Japan
[21] Appl. No.: 792,201
[22] Filed: Nov. 13, 1991
[30] Foreign Application Priority Data
  Nov. 22, 1990 [JP] Japan ............... 2-123170[U]
[51] Int. Cl.⁵ .................... B65B 31/00; B65B 57/14
[52] U.S. Cl. ........................ 141/59; 141/312;
  141/44; 137/588; 220/86.2; 220/749
[58] Field of Search ............... 141/59, 44-46,
  141/312, 302; 220/86.1, 86.2, 89.1, 745-750;
  137/587-589; 123/516-519

[56] References Cited
U.S. PATENT DOCUMENTS

| | | | |
|---|---|---|---|
| 3,800,778 | 4/1974 | Sigwald | 137/587 X |
| 4,651,889 | 3/1987 | Uranishi et al. | 137/588 X |
| 4,762,156 | 8/1988 | Rich | 141/46 |
| 4,809,865 | 3/1989 | Mori et al. | 220/86.2 |
| 4,821,908 | 4/1989 | Yost | 220/86.2 |
| 4,872,439 | 10/1989 | Sonada et al. | 123/518 |
| 4,974,645 | 12/1990 | Johnson | 141/59 |
| 5,014,742 | 5/1991 | Covert et al. | 137/588 |
| 5,054,508 | 10/1991 | Benjey | 137/43 |
| 5,054,528 | 10/1991 | Saitoh | 141/59 |

Primary Examiner—Ernest G. Cusick
Attorney, Agent, or Firm—Beveridge, DeGrandi, Weilacher & Young

[57] ABSTRACT

In an air breather system for the fuel tank of a vehicle, a mechanical seal is provided at the mouth of a filler pipe for preventing overflow from the mouth when filler gun is inserted into the mouth for fueling. The mouth is communicated with a canister for adsorbing the vapor of the fuel through an air breather passage. Even when negative pressure occurs under the mouth, normal fueling is performed without functioning the automatic stop of the filler gun.

4 Claims, 1 Drawing Sheet

AIR BREATHER SYSTEM FOR FUEL TANK

BACKGROUND OF THE INVENTION

1. Field of the Invention

The present invention relates to an air breather system for preventing blowback at fueling etc. in the fuel tank of a vehicle.

2. Description of the Prior Art

As shown in FIG. 3, when fuel is to be fed into the fuel tank of a vehicle, a filler gun 1 is put into the mouth of a filler pipe 3 for introducing the fuel into the fuel tank. The front end of the filler gun 1 is fitted through a mechanical seal 5 which is disposed in the mouth of the filler pipe 3. Then, the vicinity of the front end of the filler gun 1 comes to have a negative pressure under the influence of the inflow of the fuel into the filler pipe 3 with the fuel feed. On account of the negative pressure, the fuel shuts up the auto-stopping hole of the filler gun 1, to incur a malfunction in which the filler gun 1 is automatically stopped notwithstanding that the tank is not filled u with the fuel. In order to prevent the malfunction, a slender air breather pipe 7 which bypasses the mechanical seal 5 has heretofore been provided in the filler pipe 3 as shown in FIG. 3. Thus, the negative pressure region near the front end of the filler gun 1 is supplied with the atmospheric air from the mouth of the filler pipe 3.

According to the prior-art technique stated above, the malfunction of the automatic stop of the filler gun 1 is preventable. However, when the fuel tank has become full, it temporarily exhibits a positive (plus) internal pressure in case of the proper automatic stopping of the filler gun 1 based on the closure of a liquid level regulating float valve with which the fuel tank is furnished. Consequently, the vapor 9 of the fuel is emitted to the atmosphere through the air breather pipe 7. This might result in a situation where the fuel itself flows out in mixing with the vapor 9.

Further, when the fuel is being fed at a low flow rate by the use of the filler gun 1, the vapor is sometimes emitted to the atmosphere through the mouth of the filler pipe 3 by the backward flow thereof. More specifically, the quantity of that air in the fuel tank which is imbibed through the auto-stopping hole of the filler gun 1 is proportional to the quantity of fueling. Accordingly, when the quantity of fueling per unit time is small, also the quantity of the imbibed air naturally becomes small. On the other hand, the fuel under feed flows into the tank while swirling and undulating within the filler pipe 3, and the vapor 9 is produced in large amounts within the filler pipe 3 at that time. When the quantity of the vapor 9 exceeds the allowable quantity of the air inhibition, the vapor 9 flows backward through the air breather pipe 7 and is emitted to the atmosphere through the mouth of the filler pipe 3.

SUMMARY OF THE INVENTION

The present invention has been made in order to solve the problems stated above, and has for its object to provide an air breather system for a fuel tank which can prevent the malfunction of the automatic stop of a filler gun and which can eliminate the blowback of fuel vapor or fuel itself in a full-tank condition and the backward flow of the vapor at a low flow rate.

In one aspect of performance of the present invention, there is provided an air breather system for a fuel tank mounted on a vehicle having, a canister provided on said vehicle for adsorbing fuel vapor generated in said fuel tank, a vapor recovery hose connected between an upper portion of said fuel tank and said canister for communicating said fuel vapor, a solenoid valve interposed in said vapor recovery hose for controlling a flow of said fuel vapor, a filler pipe connected with said fuel tank for fueling, and a mechanical seal inserted in a mouth of said filler pipe for sealing a filler gun, the improvement of said air breather system which comprises an air breather passage connected between an upper wall of said canister and a position of said filler pipe neighboring a lower side of said mechanical seal for inducing fuel into said canister without overflowing from said filler pipe when filling said fuel tank; and a one-way valve provided at said upper portion of said tank for preventing a reverse flow of fuel to said canister.

According to the present invention based on the above construction, in a case where the vicinity of the front end of the filler gun has become a negative pressure during fueling, the atmospheric air is introduced into the negative pressure region through the canister as well as the air breather passage, so that the malfunction of the automatic stop of the filler gun can be prevented. Further, in a case where the pressure of the interior of the fuel tank has temporarily become a positive pressure in a full-tank condition, the positive pressure is released to the atmosphere through the filler pipe, the air breather passage and the canister. On this occasion, however, the fuel vapor is adsorbed by the canister, and it is not directly emitted to the atmosphere as in the prior art. Further, the backward flow of the vapor at a low flow rate is released to the atmosphere through the air breather passage and the canister, while at the same time, the vapor is adsorbed by the canister.

BRIEF DESCRIPTION OF THE DRAWINGS

Throughout the drawings, the same or equivalent parts are indicated by the same numerals.

PREFERRED EMBODIMENT OF THE INVENTION

Figure 1:
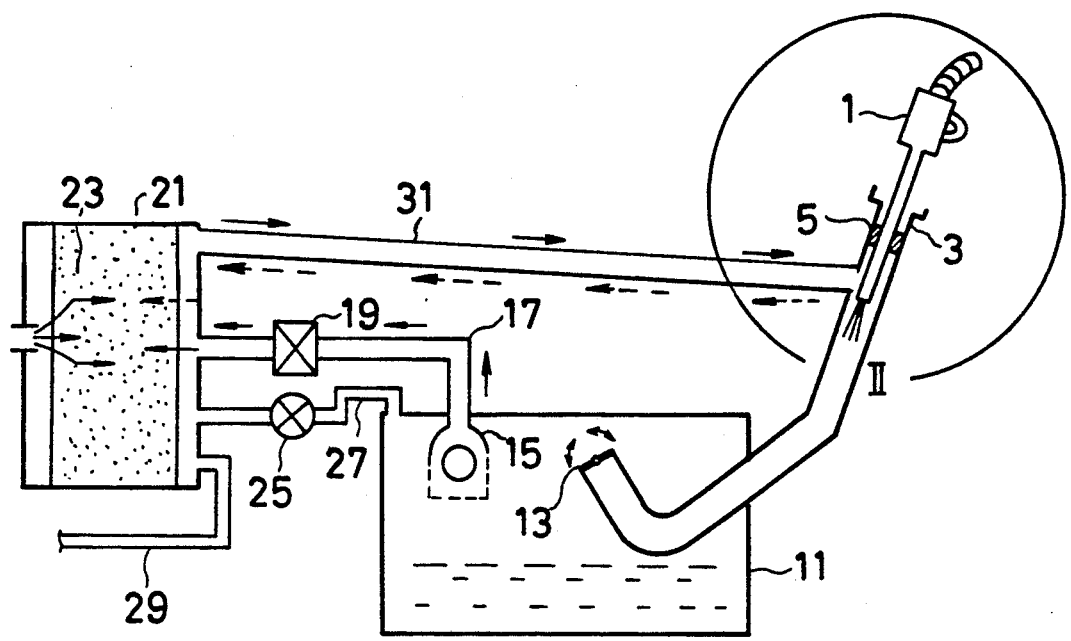
FIG. 1 is a general schematic view showing an embodiment of the present invention.
Figure 2:
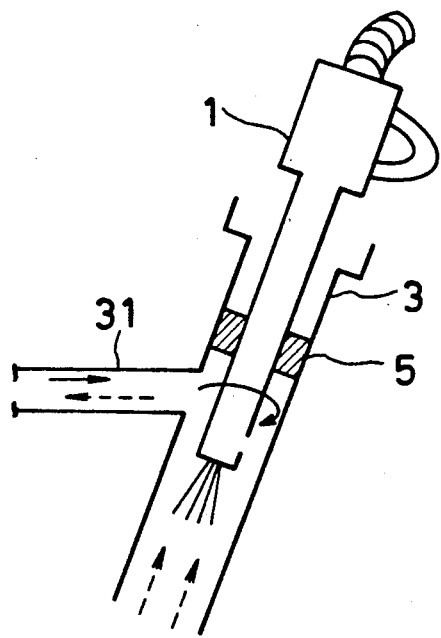
FIG. 2 is an enlarged view of a part II in FIG. 1.
Figure 3:
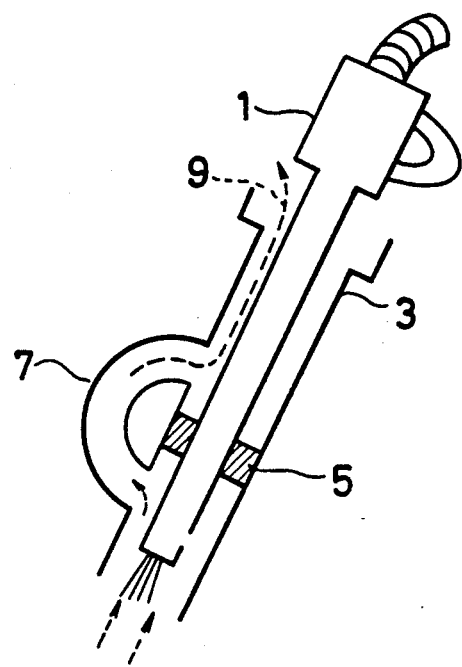
FIG. 3 is a view showing a prior-art example and corresponding to FIG. 2.

Now, an embodiment of the present invention will be described with reference to FIGS. 1 and 2. FIG. 1 is a general schematic view of an air breather system in the embodiment, while FIG. 2 is an enlarged view of a part II in FIG. 1.

A fuel tank 11 mounted on a vehicle is provided with a filler pipe 3 for introducing fuel thereinto from outside the vehicle during a fueling operation. A mechanical seal 5 is inserted near the mouth of the filler pipe 3, and the front end of a filler gun 1 is fitted through the mechanical seal 5 at the fueling. In addition, a blowback preventing valve 13 is disposed at the end of the filler pipe 3 lying within the fuel tank 11, and which renders it difficult for the fuel to flow backwards through the filler pipe 3 when the pressure of the interior of the fuel tank 11 has heightened. Besides, the fuel tank 11 is furnished with a vapor recovery hose 17 through a float valve 15 for regulating a liquid level, whereupon it is connected to a canister 21 through a solenoid valve 19 for changing-over vapor passages. The canister 21 contains therein an adsorbent 23 for adsorbing the vapor component of the fuel, and it is let open to the atmosphere at the side wall thereof. Also, another hose 27 having a two-way valve 25 midway is interposed between the fuel tank 11 and the canister 21. Further, a purge circuit 29 is connected to the canister 21.

The part of the filler pipe 3 in the vicinity of the lower surface of the mechanical seal 5 is held in communication with the canister 21 through an air breather passage 31. The air breather passage 31 should desirably be endowed with a predetermined gradient higher on its side connected to the canister 21, whereby the fuel itself is rendered difficult of flowing into the canister 21 in the wake of the blowback of the vapor of the fuel in a full-tank condition or the reverse flow of the vapor at the low flow rate of the fuel.

The operation of this embodiment will now be described. As illustrated in FIG. 2, the fueling is performed in the state in which the filler gun 1 is put in the filler pipe 3 and has its front end fitted through the mechanical seal 5. On this occasion, the vicinity of the front end of the filler gun 1, namely, that of the lower side of the mechanical seal 5 is liable to become a negative pressure. Since, however, the air breather passage 31 is connected to the negative pressure region, the atmospheric air is supplied into this region through the canister 21 as well as the air breather passage 31, and the negative pressure is nullified. Thus, smooth fueling can be realized. It is also possible to prevent the drawback that the fuel is drawn by the negative pressure to shut up the unshown auto-stopping hole of the filler gun 1, so the malfunction of the automatic stop of the filler gun 1 occurs in spite of the unfilled condition of the fuel tank 11. Incidentally, the migration of the atmospheric air which is supplied into the negative pressure region is indicated by arrows of solid lines in FIGS. 1 and 2.

In addition, when the fuel tank 11 has become filled, the liquid level regulating float valve 15 closes, and the internal pressure of the fuel tank 11 becomes positive temporarily, so that the filler gun 1 is automatically stopped appropriately. On this occasion, the temporary positive pressure within the fuel tank 11 is released to the atmosphere through the filler pipe 3, air breather passage 31 and canister 21. Herein, the vapor component of the fuel is adsorbed by the canister 21, and it can be prevented from being directly emitted to the atmosphere (the migration of the vapor is indicated by arrows of broken lines in FIGS. 1 and 2). Moreover, the fuel itself having mixed in the vapor reaches the canister 21 infrequently owing to the fact that the air breather passage 31 is long and slanted. Granted that the fuel reaches the canister 21 in a small amount, it can be satisfactorily adsorbed by this canister. Thus, it is possible to prevent the vapor from being emitted to the atmosphere or the fuel from flowing out, through the air breather pipe 7 bypassing the mechanical seal 5 as in the prior art or while passing through the mechanical seal 5.

Further, in a case where the fuel is fed at a low flow rate by the use of the filler gun 1, the backward flow of the vapor produced in large amounts within the filler pipe 3 can be guided into the canister 21 through the air breather passage 31, and the vapor component of the fuel can be adsorbed. Thus, it is possible to prevent the vapor from being directly emitted to the atmosphere.

By the way, since the atmospheric air is supplied to the negative pressure region of the filler pipe 3 through the canister 21 in the fueling operation, the part of the canister 21 open to the atmosphere sends the air into the canister 21. In the ordinary operation of the canister 21, therefore, the leakage of the vapor from the opening of the canister 21 to the atmosphere can be prevented or delayed. Accordingly, the performance of the canister 21 can be enhanced.

According to the embodiment described above, the air breather pipe 7 as in the prior art need not be formed, and the part of the filler pipe 3 vicinal to the mechanical seal 5 can be structurally simplified to attain curtailment in cost. Besides, the blowback in the condition in which the fuel tank has been filled with the fuel can be avoided. Similarly, since the blowback preventing valve 13 functioning to inhibit the backward flow in the full-tank condition may have a low finishing accuracy, the cost thereof can be curtailed. Further, since the canister 21 can have its performance enhanced as stated above, the size thereof can be reduced, and the cost thereof can be curtailed.

As described above, with the air breather system for a fuel tank according to the present invention, even when the vicinity of the front end of a filler gun has become a negative pressure during fueling, the atmospheric air is supplied into the negative pressure region through a canister as well as an air breather passage. It is therefore possible to prevent the malfunction of the automatic stop operation of the filler gun attributed to the negative pressure.

Moreover, regarding the blowback of fuel vapor or fuel itself in a full-tank condition, the vapor is emitted to the atmosphere through a filler pipe, the air breather passage and the canister. It is therefore possible to prevent the direct emission of the vapor to the atmosphere and the flowout of the gasoline mixed in the vapor as in the prior art.

Furthermore, regarding the backward flow of the vapour at the flow rate of the fuel, the vapour is guided to the atmosphere through the air breather passage as well as the canister, and it is adsorbed by the canister. Therefore, the vapour is not entirely emitted to the atmosphere as in the prior art.

While the presently preferred embodiment of the present invention has been shown and described, it is to be understood that this disclosure is for the purpose of illustration and that various changes and modifications may be made without departing from the scope of the invention as set forth in the claims.

What is claimed is:

1. An air breather system for a fuel tank mounted on a vehicle having, a canister mounted on said vehicle for adsorbing fuel vapor generated in said fuel tank, a vapor recovery hose connected between an upper portion of said fuel tank and said canister for communicating said fuel vapor, a float valve provided to close an opening of said vapor recovery hose to said fuel tank when said fuel tank has become filled by fueling, a solenoid valve interposed in said vapor recovery hose for controlling a flow of said fuel vapor, a filler pipe connected with said fuel tank for fueling, and a mechanical seal inserted in a mouth of said filler pipe for sealing a filler gun, said air breather system comprising:

an air breather passage provided separate from said vapor recovery hose and connected between an upper wall of said canister and a position of said filler pipe beneath said mechanical seal for inducing the fuel vapor into said canister without overflowing from said filler pipe when filling said fuel tank; and a blowback preventing valve provided in said filler pipe at said tank for preventing fuel from flowing backward through said filler pipe to said canister.

2. An air breather system for a fuel tank as defined in claim 1, wherein said air breather passage is inclined so as to be higher on its side connected to said canister.

3. An air breather system for a fuel tank mounted on a vehicle, comprising
- a canister for adsorbing fuel vapor generated in said fuel tank, having a first side opened to the atmosphere and a second side across a adsorbent from said first side;
- a filler pipe having two ends, one end is communicated with said fuel tank and the other end being as a mouth for fueling;
- a mechanical seal inserted in said filler pipe near said mouth for sealing a filler gun at the fueling;
- a vapor recovery hose connected between an upper portion of said fuel tank and said second side of said canister;
- a solenoid valve interposed in said vapor recovery hose for controlling a flow of said fuel vapor;
- a float valve provided to close an opening of said vapor recovery hose to said fuel tank when said fuel tank has become filled by fueling; and
- an air breather passage provided separate from said vapor recovery hose and connected between a portion of said filler pipe beneath said mechanical seal and said second side of said canister, thereby nullifying negative pressure in said filler pipe during the fueling and releasing the positive pressure with the vapor generated in said fuel tank when said fuel tank is filled up.

4. The air breather system according to claim 3, further comprising:
- a blowback preventing value mounted on an end of said filler pipe within said fuel tank for preventing fuel in said fuel tank flowing backward to said canister through said filler pipe.

* * * * *